United States Patent
Yeo (10) Patent No.: US 10,613,956 B2
(45) Date of Patent: Apr. 7, 2020

(54) TERMINAL DEVICE, SYSTEM, AND METHOD FOR PROCESSING SENSOR DATA STREAM

(71) Applicant: SAMSUNG ELECTRONICS CO., LTD., Suwon-si, Gyeonggi-do (KR)

(72) Inventor: Hae-dong Yeo, Suwon-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 642 days.

(21) Appl. No.: 14/564,182

(22) Filed: Dec. 9, 2014

(65) Prior Publication Data
US 2015/0161021 A1    Jun. 11, 2015

(30) Foreign Application Priority Data
Dec. 9, 2013 (KR) .................. 10-2013-0152650

(51) Int. Cl.
*H03F 1/26* (2006.01)
*G06F 11/30* (2006.01)
(Continued)

(52) U.S. Cl.
CPC .......... *G06F 11/30* (2013.01); *H04L 43/0817* (2013.01); *H04L 43/10* (2013.01);
(Continued)

(58) Field of Classification Search
CPC ...................................................... G06F 11/30
(Continued)

(56) References Cited

U.S. PATENT DOCUMENTS 6,374,336 B1 * 4/2002 Peters ................. G06F 11/1076
    711/167
6,611,289 B1 * 8/2003 Yu .......................... H04N 9/045
    348/265
(Continued)

FOREIGN PATENT DOCUMENTS

EP          2 053 786 A2    4/2009
WO    WO 2013/105732    *  7/2013    ............. H05B 37/02
WO       2014/193940 A1    12/2014

OTHER PUBLICATIONS

Sung-Mee Park et al: "Load Balancing Method Using Connection Pool in RFID Middleware", Software Engineering Research, Management&Applications, 2007. SERA 2007. 5th ACIS International Conference on, IEEE, Piscataway, NJ, USA, 1, Aug. 2007, pp. 132-137, XP031131140, ISBN: 978-07695-2867-0.
(Continued)

*Primary Examiner* — Jay C Kim
(74) *Attorney, Agent, or Firm* — Staas & Halsey LLP (57) ABSTRACT

A terminal device, a system, and a method for efficiently processing sensor data streams. The system for processing sensor data streams includes: at least one data collection unit for receiving the sensor data streams from at least one terminal device; and an allocation unit for monitoring a status of the at least one data collection unit, selecting one of the at least one data collection unit by using a monitoring result, and allocating the at least one terminal device to the selected data collection unit, wherein the at least one data collection unit receives the sensor data streams from the at least one terminal device allocated by the allocation unit.

15 Claims, 6 Drawing Sheets

US 10,613,956 B2
Page 2

(51) Int. Cl.
*H04L 29/08* (2006.01)
*H04W 4/00* (2018.01)
*H04L 12/26* (2006.01)
*H04W 4/38* (2018.01)

(52) U.S. Cl.
CPC ........... *H04L 67/1002* (2013.01); *H04W 4/00* (2013.01); *H04W 4/38* (2018.02); *H04L 67/12* (2013.01)

(58) Field of Classification Search
USPC ........................................................ 702/189
See application file for complete search history.

(56) References Cited

U.S. PATENT DOCUMENTS

| | | | |
|---|---|---|---|
| 6,853,920 B2* | 2/2005 | Hsiung | G05B 15/02 702/1 |
| 6,889,174 B2* | 5/2005 | Williams | H05B 37/0245 315/129 |
| 6,891,838 B1* | 5/2005 | Petite | H04L 12/2825 340/870.02 |
| 6,914,893 B2* | 7/2005 | Petite | G01V 1/364 370/338 |
| 6,947,601 B2* | 9/2005 | Aoki | H04N 7/142 348/E7.079 |
| 7,239,231 B2* | 7/2007 | Tsukamoto | B60Q 1/1423 315/77 |
| 7,263,073 B2* | 8/2007 | Petite | G01D 4/004 370/278 |
| 7,342,917 B2* | 3/2008 | Mohan | H04L 29/06027 370/352 |
| 7,369,060 B2* | 5/2008 | Veskovic | H05B 37/0254 340/12.52 |
| 7,426,439 B2* | 9/2008 | Ozdemir | G01V 1/201 702/17 |
| 7,440,013 B2* | 10/2008 | Funakura | G06K 9/00228 348/239 |
| 7,523,191 B1* | 4/2009 | Thomas | G06F 11/3438 709/202 |
| 7,676,146 B2* | 3/2010 | Border | H04N 5/23212 348/22 |
| 7,680,600 B2* | 3/2010 | Carnegie | G01V 1/48 166/250.01 |
| 7,715,951 B2* | 5/2010 | Forbes, Jr. | G01D 4/004 700/291 |
| 7,729,602 B2* | 6/2010 | Janson, Jr. | G03B 15/00 348/218.1 |
| 7,739,378 B2* | 6/2010 | Petite | H04B 1/3827 340/539.22 |
| 7,840,287 B2* | 11/2010 | Wojsznis | G05B 17/02 700/38 |
| 7,859,588 B2* | 12/2010 | Parulski | H04N 5/2258 348/349 |
| 7,979,439 B1* | 7/2011 | Nordstrom | G06F 17/30312 707/741 |
| 8,112,425 B2* | 2/2012 | Baum | G06F 17/30551 707/746 |
| 8,122,146 B1 | 2/2012 | Lu et al. | |
| 8,126,848 B2* | 2/2012 | Wagner | G06F 16/27 707/648 |
| 8,145,183 B2* | 3/2012 | Barbeau | H04M 3/42348 455/404.1 |
| 8,185,654 B2 | 5/2012 | Degenaro et al. | |
| 8,275,548 B2* | 9/2012 | Marshall | G01W 1/16 702/4 |
| 8,332,184 B2* | 12/2012 | Barnes | G01V 7/06 702/189 |
| 8,437,969 B2* | 5/2013 | Zhang | G01R 19/2513 702/182 |
| 8,482,571 B2* | 7/2013 | Shiraki | G06T 1/20 345/501 |
| 8,601,112 B1* | 12/2013 | Nordstrom | G06Q 10/0631 707/600 |
| 8,612,599 B2* | 12/2013 | Tung | G06F 11/3495 709/224 |
| 8,662,384 B2* | 3/2014 | Dodin | G06Q 20/02 235/378 |
| 8,712,366 B2* | 4/2014 | Greene | G10L 13/043 455/404.1 |
| 8,718,595 B2* | 5/2014 | Ray | G10L 13/043 455/404.1 |
| 8,721,132 B2* | 5/2014 | Beardsley | H05B 37/0272 362/362 |
| 8,744,420 B2* | 6/2014 | Cranfill | H04N 7/147 348/14.01 |
| 8,786,189 B2* | 7/2014 | Mayfield | H05B 37/0272 315/76 |
| 8,832,649 B2* | 9/2014 | Bishop | G06F 11/30 717/107 |
| 8,855,279 B2* | 10/2014 | Forbes, Jr. | G06Q 10/00 379/106.03 |
| 8,866,408 B2* | 10/2014 | Chemel | H05B 37/029 315/291 |
| 8,866,943 B2* | 10/2014 | Park | H04N 5/23222 348/139 |
| 8,922,658 B2* | 12/2014 | Galvin | H04N 7/181 348/143 |
| 8,923,803 B2* | 12/2014 | Ray | G10L 13/043 455/404.2 |
| 8,931,505 B2* | 1/2015 | Hyland | E03B 9/06 137/296 |
| 8,954,170 B2* | 2/2015 | Chemel | H05B 37/029 315/297 |
| 8,977,371 B2* | 3/2015 | Ashdown | H05B 37/02 700/11 |
| 9,014,829 B2* | 4/2015 | Chemel | F21V 23/0471 700/90 |
| 9,037,698 B1* | 5/2015 | Nordstrom | G06F 11/301 707/736 |
| 9,072,133 B2* | 6/2015 | Chemel | F21S 2/005 |
| 9,084,305 B2* | 7/2015 | Toda | H05B 37/02 |
| 9,121,407 B2* | 9/2015 | Pham | F04C 28/00 |
| 9,202,362 B2* | 12/2015 | Hyland | G08B 25/08 |
| 9,210,770 B2* | 12/2015 | Yoon | H05B 33/0851 |
| 9,285,802 B2* | 3/2016 | Arensmeier | G05B 23/0224 |
| 9,310,094 B2* | 4/2016 | Kates | F25B 49/005 |
| 9,411,810 B2* | 8/2016 | Mark | G06F 16/215 |
| 9,510,426 B2* | 11/2016 | Chemel | H05B 33/0854 |
| 9,867,023 B2* | 1/2018 | Rauner | H04L 12/1895 |
| 2002/0013679 A1* | 1/2002 | Petite | G08B 25/007 702/188 |
| 2003/0012425 A1* | 1/2003 | Suzuki | G02B 27/0093 382/154 |
| 2003/0028632 A1* | 2/2003 | Davis | H04L 12/1877 709/224 |
| 2003/0034900 A1* | 2/2003 | Han | G01D 4/004 340/870.02 |
| 2003/0058818 A1* | 3/2003 | Wilkes | H04W 36/0055 370/331 |
| 2004/0077347 A1* | 4/2004 | Lauber | G08G 1/0962 455/428 |
| 2005/0262923 A1* | 12/2005 | Kates | F24F 11/30 73/29.01 |
| 2006/0069717 A1* | 3/2006 | Mamou | G06F 17/30563 709/203 |
| 2006/0076908 A1* | 4/2006 | Morgan | H05B 33/0842 315/312 |
| 2006/0140209 A1* | 6/2006 | Cassiolato | H04L 12/417 370/466 |
| 2008/0234869 A1* | 9/2008 | Yonezawa | F24F 11/30 700/276 |
| 2009/0038010 A1* | 2/2009 | Ma | G06F 11/3672 726/23 |
| 2009/0055465 A1* | 2/2009 | DePue | H04L 43/065 709/202 |
| 2010/0141784 A1* | 6/2010 | Yoo | H04N 5/23219 348/222.1 |

(56) References Cited

U.S. PATENT DOCUMENTS

| | | | | |
|---|---|---|---|---|
| 2010/0308736 | A1* | 12/2010 | Hung | H05B 37/034 315/149 |
| 2011/0115787 | A1* | 5/2011 | Kadlec | G01V 1/345 345/419 |
| 2011/0276312 | A1* | 11/2011 | Shalon | A61B 5/11 702/187 |
| 2012/0143383 | A1* | 6/2012 | Cooperrider | H04Q 9/00 700/295 |
| 2013/0116952 | A1* | 5/2013 | Chai | H04Q 9/00 702/61 |
| 2013/0257289 | A1* | 10/2013 | VanWagoner | H05B 37/0209 315/152 |
| 2013/0307989 | A1 | 11/2013 | Stone et al. | |
| 2014/0055040 | A1* | 2/2014 | Nishigaki | H05B 37/02 315/152 |
| 2014/0097758 | A1* | 4/2014 | Recker | H05B 37/0272 315/152 |
| 2014/0117856 | A1* | 5/2014 | Cho | H05B 37/0218 315/149 |
| 2014/0278260 | A1* | 9/2014 | Gettings | G01N 33/0062 702/189 |
| 2015/0094990 | A1* | 4/2015 | Beisiegel | H04Q 9/00 702/189 |

OTHER PUBLICATIONS

Shane B. Eisenman et al: "BikeNet", ACM Transactions on Sensor Networks, val. 6, No. 1, Dec. 1, 2009, pp. 1-39, XP055063121, ISSN: 1550-4859, DOI: 1 0.1145/1653760.1653766.

Mohomed I et al: "Context-aware and personalized event filtering for low-overhead continuous remote health monitoring", World of Wireless, Mobile and Multimedia Networks, 2008. WOWMOM 2008. 2008 International Symposium on A, IEEE, Piscataway, NJ, USA, Jun. 23, 2008, pp. 1-8, XP031302748, ISBN: 978-1-4244-2099-5.

European Search Report dated May 4, 2015 in corresponding European Patent Application 14197022.8.

Seungwoo Kang, et al., "MobiCon: Mobile Context Monitoring Platform for Sensor-Rich Dynamic Environments", Dec. 1, 2010, XP055064395, URL: http://www.csc.lsu.edu/~iyengar/final-papers/CACM_m.pdf.

* cited by examiner

TERMINAL DEVICE, SYSTEM, AND METHOD FOR PROCESSING SENSOR DATA STREAM

CROSS-REFERENCE TO RELATED APPLICATIONS

This application claims the benefit of Korean Patent Application No. 10-2013-0152650, filed on Dec. 9, 2013, in the Korean Intellectual Property Office, the disclosure of which is incorporated herein in its entirety by reference.

BACKGROUND

1. Field

One or more embodiments relate to a terminal device, a system, and a method for processing sensor data streams.

2. Description of the Related Art

With the development of communication technology and miniaturization of electronic devices, personal terminal devices are being widely used. Personal terminal devices such as desktop computers, laptop computers, smart phones or smart tablets have come into widespread use.

In this environment, it has been possible to transmit sensor data included in a terminal device or detected by using various types of sensors connected to the terminal device to a server in real time. For example, a sensor may be used to detect a place where the sensor exists, a temperature, humidity, noise, a peripheral image, etc. The sensor data may be detected continuously or, when a specific condition is satisfactory, repeatedly.

The detected sensor data may be transmitted to the server in real time. The sensor data detected continuously or repeatedly and transmitted in real time is referred to as sensor data streams. Sensor data streams may be used to monitor whether a production facility of a company malfunctions or not in real time and monitor a health condition of a person in real time.

Sensor data streams may include erroneously detected noise data. Sensor data streams may also include sensor data having a similar value or a specific pattern.

A system receiving sensor data streams from a plurality of terminal devices may include a plurality of servers. Sensor data streams may include a great amount of data. Thus, when data is not properly distributed in servers included in the system, sensor data streams may be inefficiently processed. This may result in interruptions of the processing of one or more of the sensor data streams.

SUMMARY

One or more embodiments include a terminal device, a system, and a method for efficiently processing sensor data streams.

One or more embodiments include a terminal device, a system, and a method for effectively filtering noise data included in sensor data streams.

One or more embodiments include a terminal device, a system, and a method for more efficiently transmitting or receiving sensor data streams.

One or more embodiments include a terminal device, a system, and a method for efficiently adjusting a load of a server receiving sensor data streams.

Additional aspects will be set forth in part in the description which follows and, in part, will be apparent from the description, or may be learned by practice of the presented embodiments.

According to one or more embodiments, a system for processing sensor data streams includes at least one data collection unit for receiving the sensor data streams from at least one terminal device; and an allocation unit for monitoring a status of the at least one data collection unit, selecting one of the at least one data collection unit by using a monitoring result, and allocating the at least one terminal device to the selected data collection unit, wherein the at least one data collection unit receives the sensor data streams from the at least one terminal device allocated by the allocation unit.

The allocation unit may receive status information of the at least one terminal device or a user of the at least one terminal device and an allocation request from the at least one terminal device, and select the data collection unit by using the status information and the monitoring result in response to the allocation request.

The status information may include an activity history of the user, status time information, location information of the at least one terminal device, or information corresponding to sensor data included in the sensor data streams.

The allocation unit may monitor information regarding an availability of each of the at least one data collection unit and a load level thereof, and select the data collection unit by using the information regarding the availability of each of the at least one data collection unit 131 and the load level thereof.

The allocation unit may receive status information of the at least one terminal device and a user of the at least one terminal device and an allocation request from the at least one terminal device, predict an amount of data included in the sensor data streams from the at least one terminal device by using the received status information and a prediction reference, and select the data collection unit by using the predicted amount of data and the monitoring result in response to the allocation request.

The prediction reference may include information regarding a relationship between the status information and the amount of data.

The system may further include: a pattern analyzing unit for analyzing the relationship between the status information and the amount of data and renewing the prediction reference by using an analysis result.

The system may further include: a postprocessing unit for removing noise data from sensor data included in the sensor data streams received by the at least one data collection unit.

The postprocessing unit may detect and remove the noise data according to a filtering reference and compresses the sensor data from which noise data has been removed.

The system may further include: a pattern analyzing unit for analyzing a pattern of the sensor data and renewing the filtering reference by using an analysis result.

According to one or more embodiments, a system for processing sensor data streams includes: a load adjustment unit for receiving the sensor data streams and status information of at least one terminal device or a user of the at least one terminal device, from the at least one terminal device; and at least one data collection unit for receiving the sensor data streams from the load adjustment unit, wherein the load adjustment unit monitors a status of the at least one terminal device, predicts an amount of data included in the sensor data streams from the at least one terminal device by using the status information and a prediction reference, selects one of the at least one data collection unit by using the predicted amount of data and a monitoring result, and transmits the sensor data streams of the at least one terminal device to the selected data collection unit.

The system may further include: a pattern analyzing unit for analyzing a relationship between the received status information and sensor data included in the sensor data streams and renewing the prediction reference by using an analysis result.

The system may further include: a postprocessing unit for removing noise data from sensor data included in the received sensor data streams.

According to one or more embodiments, a method of processing sensor data streams includes: detecting status information of a terminal device or a user of the terminal device; transmitting a request for information regarding a first object server that is to transmit the sensor data streams and the status information to a relay server; receiving the information regarding the first object server in response to the request; and transmitting the sensor data streams and the status information to the first object server.

The method may further include: after transmitting the sensor data streams and the status information to the first object server, receiving information regarding a second object server from the relay server; and transmitting the sensor data streams and the status information to the second object server.

The status information may include an activity history of the user, status time information, location information of the at least one terminal device, or information corresponding to sensor data included in the sensor data streams.

According to one or more embodiments, a method of processing sensor data streams includes monitoring a status of at least one server that is to receive the sensor data streams from a terminal device; receiving status information of the terminal device or a user of the terminal device and an allocation request for the at least one server from the terminal device; selecting one of the at least one server by using the received status information and a monitoring result in response to the allocation request; transmitting information regarding the selected server to the terminal device; and receiving the sensor data streams from the terminal device by using the selected server.

The selecting of the one of the at least one server may include: predicting an amount of data included in the sensor data streams from the terminal device by using the received status information and a prediction reference; and selecting one of the at least one server by using the predicted amount of data and a monitoring result.

The method may further include: after receiving the sensor data streams from the terminal device by using the selected server, analyzing a relationship between sensor data included in the received sensor data streams and the status information; and renewing the prediction reference by using an analysis result.

The method may further include: after receiving the sensor data streams from the terminal device by using the selected server, removing noise data from sensor data included in the received sensor data streams according to a filtering reference.

The method may further include: after removing noise data from sensor data included in the received sensor data streams according to a filtering reference, analyzing a pattern of sensor data included in the received sensor data streams; and renewing the filtering reference by using an analysis result.

According to one or more embodiments, a data processing apparatus may include a plurality of data collection units each configured to receive sensor data streams and status information from an external device and an allocation unit, controlled by a processor, to monitor a status of each of the plurality of data collection units and to allocate a data collection unit of the plurality of data collection units to a first external device of the plurality of external devices based on the respective status of the data collection units and the status information received from the external device.

In the data processing apparatus, the status monitored by the allocation unit includes a respective load level of each of the plurality of data collection units.

In the data processing apparatus, the status information received from the external device indicates a data output of the external device.

In the data processing apparatus, the allocation unit predicts the predicted data output of the external device using the status information received from the external device and a prediction reference comprising information about a relationship between the status information received from the external device and the predicted data output.

According to one or more embodiments, a data processing apparatus includes a plurality of data collection units each configured to receive sensor data streams and status information from a terminal device and a load adjustment unit, controlled by a processor, to monitor a load level of each of the plurality of data collection units and a status of the terminal device, to predict an amount of data included in the sensor data from the terminal device based on the status information of the terminal device, and to select a data collection unit of the plurality of data collection units based on the respective load level of the data collection units and the status information received from the terminal device.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description. Like reference numerals denote like elements. Expressions such as "at least one of," when preceding a list of elements, modify the entire list of elements and do not modify the individual elements of the list.

It will be understood that although the terms "first" and "second" are used only to describe various components, these components should not be limited by these terms. These terms may be used to distinguish one of the components from another component. Thus, throughout the specification, a first component may indicate a second component without conflicting with the present invention.

Throughout the specification, a singular form may include plural forms, unless there is a particular description contrary thereto. Throughout the specification, a singular form may include plural forms, unless there is a particular description contrary thereto. Also, terms such as "comprise" or "comprising" are used to specify existence of a recited form, a number, a process, an operations, a component, and/or groups thereof, not excluding the existence of one or more other recited forms, one or more other numbers, one or more other processes, one or more other operations, one or more other components and/or groups thereof.

Unless expressly described otherwise, all terms including descriptive or technical terms which are used herein should be construed as having meanings that are obvious to one of ordinary skill in the art. Also, terms that are defined in a general dictionary and that are used in the following description should be construed as having meanings that are equivalent to meanings used in the related description, and unless expressly described otherwise herein, the terms should not be construed as being ideal or excessively formal.

Hereinafter, a terminal device 110, a system 130, and a method for efficiently processing sensor data streams will be described in detail with reference to FIGS. 1 through 6.

Figure 1:
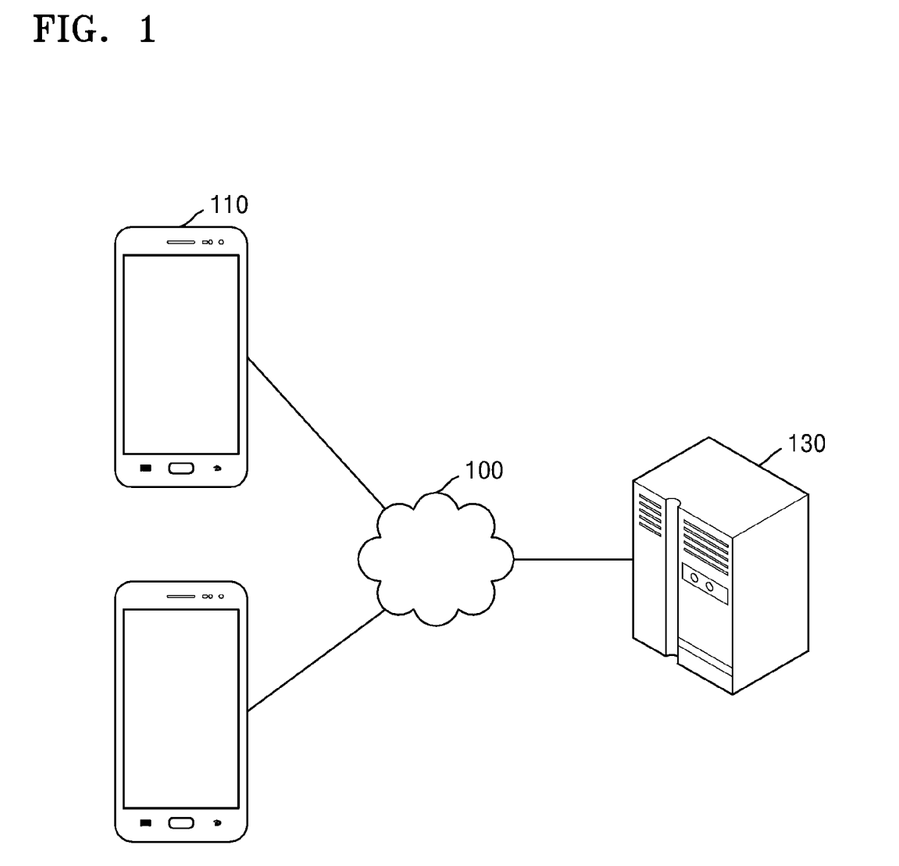
FIG. 1 is a configuration diagram of a network environment in which a terminal device and a system for efficiently processing sensor data streams operate, according to an embodiment.

FIG. 1 is a configuration diagram of a network environment in which the terminal device 110 and the system 130 for efficiently processing sensor data streams operate, according to an embodiment. Referring to FIG. 1, the network environment in which the terminal device 110 and the system 130 for efficiently processing sensor data streams operate may include a communication network 100, the at least one terminal device 110 connected to the communication network 100, and the system 130 connected to the communication network 100.

The communication network 100 may be configured in a wired or wireless communication manner. The communication network 100 may include WiFi, UMTS/GPRS, Ethernet, etc. The communication network 100 may be configured as various types of networks, such as a local area network (LAN), a metropolitan area network (MAN), a wide area network (WAN), etc. The communication network 100 connecting elements may be different from the communication network 100 connecting elements whose at least one is different. However, for convenience of description, the term "communication network 100" may be used to mean all types of the communication networks 100.

The terminal device 110 may be connected to the communication network 100. Two terminal devices 110 are shown in FIG. 1 for convenience of description. There is one terminal device or three or more terminal devices. In other words, the network environment may include the at least one terminal device 110 connected to the communication network 100. The terminal device 110 may be a vehicle mounted terminal device such as a desktop computer. The terminal device 110 may be a portable terminal device such as a laptop computer, a smart phone, a tablet, etc.

The system 130 may be connected to the communication network 100. The system 130 may be connected to the terminal device 110 over the communication network 100.

The system 130 may transmit and receive data to and from the terminal device 110. A detailed configuration of the system 130 will be described later.

Figure 2:
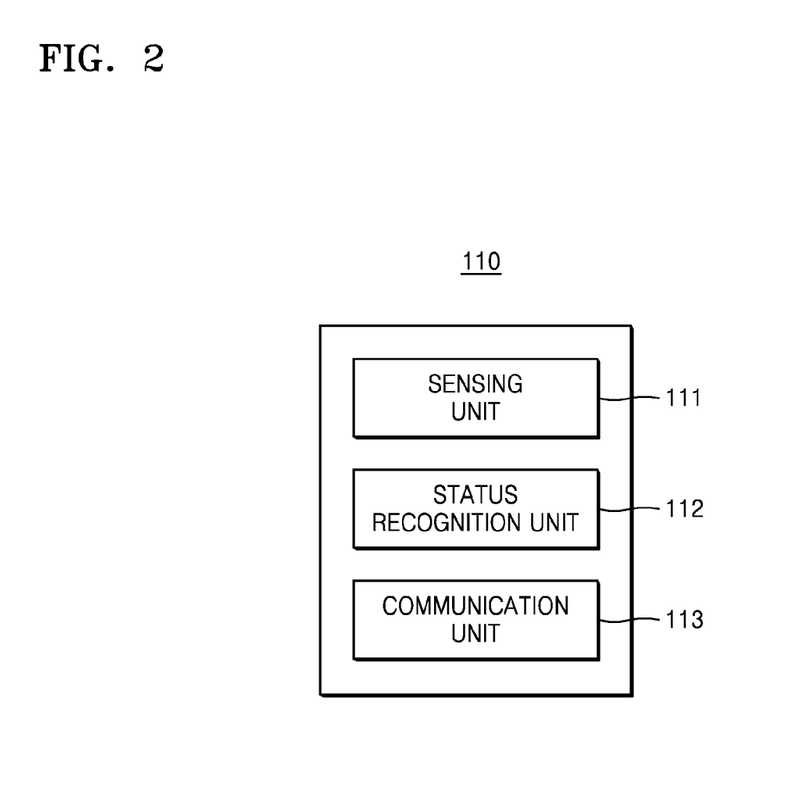
FIG. 2 is a block diagram of a terminal device for processing sensor data streams, according to an embodiment.

FIG. 2 is a block diagram of the terminal device 110 for processing sensor data streams, according to an embodiment. Referring to FIG. the terminal device 110 may include, for example, a sensing unit 111, a status recognition unit 112, and a communication unit 113.

The sensing unit 111 may detect sensor data. The sensing unit 11 may include at least one sensor. The sensor may be, for example, a location sensor such as a GPS module, a temperature sensor, a humidity sensor, a noise sensor such as a microphone, an optical sensor, an image sensor such as a camera, a bio sensor, or an acceleration sensor, etc. but is not limited thereto. Any types of sensors may be used as long as they may detect information regarding an environment in which they are present.

The sensing unit 111 may detect information regarding an environment in which the terminal device 110 is present. For example, when the sensing unit 111 includes the temperature sensor, the sensing unit 111 may detect the information regarding the environment in which the terminal device 110 is present. The information detected by the sensing unit 111 is referred to as sensor data.

The sensor data may be consecutively detected. According to another embodiment, the sensor data may be repeatedly detected whenever a specific condition is satisfied. For example, the sensor data may be regularly detected at a uniform period of time. The sensor data may be detected only with respect to information having a value greater than a threshold value.

The status recognition unit 112 may detect status information of the terminal device 110 or a user of the terminal device 110. The status recognition unit 112 may recognize a status of the terminal device 110 or the user of the terminal device 110 by using, for example, an activity history of the user, status time information, location information of the terminal device 110, or the sensor data detected by the sensing unit 111.

For example, the status recognition unit 112 may recognize a status that the user of the terminal device 110 is sleeping by using information indicating that a peripheral environment of the terminal device 110 detected by an illumination sensor is dark and information indicating that a current time is midnight. For another example, the status recognition unit 112 may recognize a status that the user of the terminal device 110 is seeing a performance by using the information indicating that the peripheral environment of the terminal device 110 detected by the illumination sensor is dark, information indicating that a peripheral environment of the terminal device 110 detected by the noise sensor is noisy, and information indicating that a current time is daytime.

The status recognition unit 112 may recognize a current status of the terminal device 110 or the user of the terminal device 110 by using accumulated information regarding the status of the terminal device 110 or the user of the terminal device 110. For example, the status recognition unit 112 may analyze and store information regarding a daily life pattern of the user of the terminal device 110. The status recognition unit 112 may recognize the current status of the terminal device 110 or the user of the terminal device 110 by using information regarding the life pattern, the current time information, the location information of the terminal device 110, or the sensor data detected by the sensing unit 111.

For example, the status recognition unit 112 may store information indicating that the user goes to the office around at 9 am by analyzing the time information and the location information. The status recognition unit 112 may recognize a status that the user of the terminal device 110 is currently going to the office by using the information regarding the life pattern, information indicating that a current time is 9 am, and information detected by a speed sensor.

The status recognition unit 112 may include, for example, a central processing unit (CPU). The CPU uses various types of information to perform a calculation, thereby detecting the status information of the terminal device 110 or the user of the terminal device 110.

The communication unit 113 may transmit the detected sensor data and the detected status information to the outside. The communication unit 13 may include an output device. The communication unit 113 may include, for example, a network interface. The communication unit 113 may transmit the sensor data detected by the sensing unit 111 to the system 130. The communication unit 113 may transmit the status information detected by the status recognition unit 112 to the system 130.

The communication unit 113 may transmit the sensor data to the system 130 in real time. The communication unit 113 may stream the sensor data to the system 130. In other words, the communication unit 130 may transmit the sensor data streams including the detected sensor data to the system 130. The communication unit 113 may transmit the sensor data streams including the detected sensor data and the detected status information to the system 130.

The communication unit 113 may receive data from the outside. The communication unit 113 may include an input device. The communication unit 113 may include, for example, a network interface. The communication unit 113 may receive data from the system 130.

Figure 3:
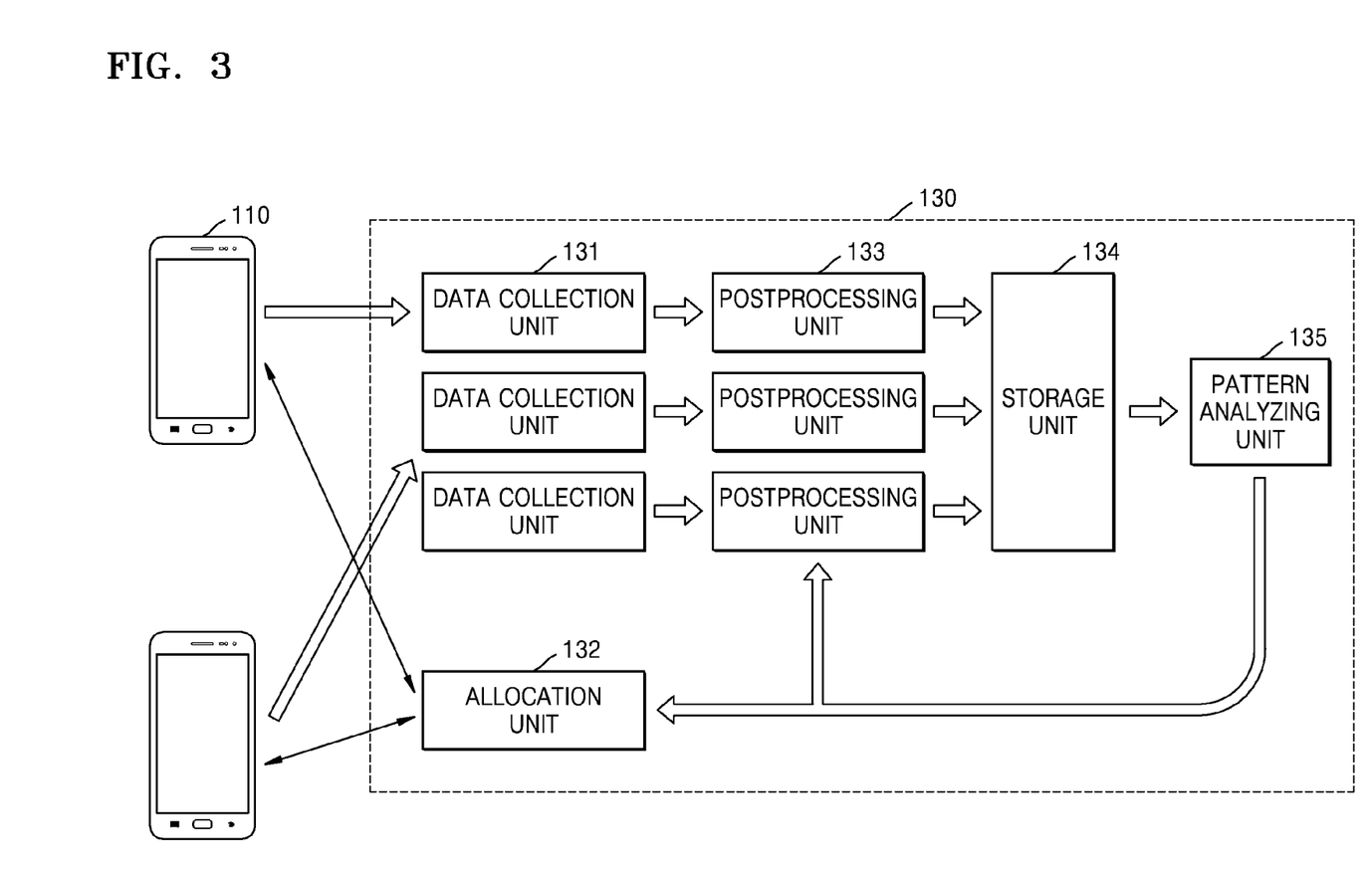
FIG. 3 is a block diagram of a system for processing sensor data streams, according to an embodiment.

FIG. 3 is a block diagram of the system 130 for processing sensor data streams, according to an embodiment. Referring to FIG. 3, the system 130 may include, for example, a data collection unit 131, an allocation unit 132, a postprocessing unit 133, a storage unit 134, and a pattern analyzing unit 135. Each of elements may include at least one server. According to another embodiment, at least one of the elements may be included in a server.

The data collection unit 131 may receive the sensor data streams from the terminal device 110. The system 130 may include at least one data collection unit 131. The at least one data collection unit 131 may correspond to the at least one terminal device 110. The single terminal device 110 may correspond to only the single data collection unit 131. That is, in an embodiment, each data collection unit 131 will receive all sensor data from only a corresponding single terminal device 110. In an alternative embodiment, each data collection unit 131 may receive data from a plurality of terminal devices 110 or each terminal device 110 may provide data to one or more of the data collection units 131.

The allocation unit 132 may monitor a status of the data collection unit 131. The allocation unit 132 may allocate the terminal device 110 to the data collection unit 131 according to the status of each of the data collection units 131. The data collection unit 131 may receive the sensor data streams from the located terminal device 110.

The allocation unit 132 may communicate with the terminal device 110. Before the terminal device 110 has been allocated to the data collection unit 131, the terminal device 110 may transmit an allocation request and status information detected by the status recognition unit 112 to the allocation unit 132. The allocation unit 132 may allocate the terminal device 110 to the data collection unit 131 according to the status information and the status of each of the data collection units 131 in response to the allocation request. The allocation unit 132 may transmit information regarding the data collection unit 131 to whichever terminal device 110 the data collection unit 131 has been allocated. The terminal device 110 may transmit the sensor data streams to the data collection unit 131 to which the terminal device 110 has been allocated.

The allocation unit 132 may monitor a resource change in each of the data collection units 131. The allocation unit 132 may store information regarding an availability of each of the data collection units 131 and a load level thereof. The load level of the allocation unit 132 may refer to the amount of data currently being processed by the allocation unit 132 in relation to the total data processing capacity of the allocation unit 132. The allocation unit 132 may select and allocate the data collection units 131 suitable for the terminal device 110 from among the plurality of data collection units 131 by using the information regarding the availability of each of the data collection units 131 and the load level thereof.

The allocation unit 132 may predict a data amount included in the sensor data streams of the terminal device 110 by using the status information received from the terminal device 110 and a prediction reference. For example, it is assumed that sensor data is detected only with respect to information having a value greater than a threshold value. When status information indicating that a user of the terminal device 110 is sleeping is received, the allocation unit 132 may predict that a heartbeat data amount included in the sensor data streams is not great. When status information indicating that the user of the terminal device 110 is exercising, the allocation unit 132 may predict that the heartbeat data amount included in the sensor data streams is great.

As another example, when status information indicating that a user of the terminal device 110 is changing locations rapidly, due to rapid movement of the user in a vehicle for example, the allocation unit 132 may predict that a location data amount included in the sensor data streams is relatively large. When status information indicating that the user of the terminal device 110 is stationary or in a fixed location, the allocation unit 132 may predict that the location data amount included in the sensor data streams is relatively small. As still another example, when status information indicating that a user of the terminal device 110 has switched the terminal device 110 off or into sleep mode, the allocation unit 132 may predict that the data amount included in the sensor data streams is relatively small. When status information indicating that the user of the terminal device 110 has switched the terminal device 110 on or into awake mode, the allocation unit 132 may predict that the data amount included in the sensor data streams is relatively large. Thus, an amount of data included in the sensor data streams of each of the terminal devices 110 may vary greatly based on the activity, location, and other circumstances of the user who operates or carries the respective terminal device 110.

The prediction reference may include information regarding a relationship between the status information and the data amount. For example, the prediction information may include information indicating that the heartbeat data amount included in the sensor data streams is not great during a sleeping status and information indicating that the heartbeat data amount included in the sensor data streams is great during an exercising status as described above.

The allocation unit 132 may select and allocate the data collection units 131 suitable for the terminal device 110 from among the plurality of data collection units 131 by using the status information received from the terminal device 110. The allocation unit 132 may select and allocate the data collection units 131 suitable for the terminal device 110 according to the data amount predicted by using the status information received from the terminal device 110.

For example, it is assumed that a current load of the first data collection unit 131 is 40%, and a current load of the second data collection unit 131 is 60%. It is also assumed that status information indicating that a status of the user has been recently changed from the sleeping status to the exercising status has been received from the terminal device 110 allocated to the first data collection unit 131. It is also assumed that status information indicating that the status of the user has been recently changed from an on-duty status to an off-duty status has been received from the terminal device 110 allocated to the second data collection unit 131.

Although the current load of the second data collection unit 131 is greater than the current load of the first data collection unit 131, the allocation unit 132 may predict that a load of the first data collection unit 131 will gradually increase, and a load of the second collection unit 131 will gradually decrease, with the result that the load of the first data collection unit 131 becomes greater than the load of the second data collection unit 131. Thus, when the allocation unit 132 receives an allocation request from the new terminal device 110, the allocation unit 132 may allocate the new terminal device 110 to the second data collection unit 131 having the lighter load.

In particular, in another embodiment described with reference to FIG. 3, the data collection unit 131 corresponding to the terminal device 110 directly receives the sensor data streams from the terminal device 110, thereby smoothly receiving a mass capacity of sensor data streams without causing a bottleneck. The allocation unit 132 allocates the terminal device 110 to the data collection units 131 according to a monitoring result of the data collection units 131, thereby efficiently adjusting a load of the data collection units 131.

The postprocesing unit 133 may remove noise data from the sensor data included in the sensor data streams received from the data collection unit 131. The postprocessing unit 133 may compress the sensor data from which noise data has been removed, thereby processing the sensor data in a way easier to store.

The postprocessing unit 133 may be connected to the data collection unit 131. The postprocessing unit 133 and the data collection unit 131 may be included in a same server. The system 130 may include at least one postprocessing unit 133. One postprocessing unit 130 may correspond to one data collection unit 131. The postprocessing unit 133 may receive the sensor data streams from the corresponding data collection unit 131.

The postprocessing unit 133 may remove the noise data included in the sensor data streams according to a filtering reference. When the sensor data is continuously detected and streamed, the sensor data streams may include sensor data having a similar value or a specific pattern. The sensor data streams may include the noise data. Semantic data analyzed by using the sensor data may have the specific pattern. Thus, the postprocessing unit 133 may use the previously received sensor data to determine whether the sensor data is noise data.

For example, when the sensor data is extremely different from a previously analyzed pattern, the postprocessing unit 133 may determine that the sensor data is noise data. For example, the postprocessing unit 133 may determine that sensor data including a value greater more than 5 times than an average value of recently received sensor data as noise data. Alternatively, other statistical techniques may be used to detect outliers in the sensor data as noise data.

The storage unit 134 may store the sensor data included in the sensor data streams and the status information. The storage unit 134 may store the sensor data from which noise data has been removed. The storage unit 134 may be, for example, a database. The storage unit 134 may be connected to the postprocessing unit 133. The storage unit 134 may receive and store the sensor data from which noise data has been removed from the postprocessing unit 133.

The pattern analyzing unit 135 may renew the prediction reference or the filtering reference by using the stored sensor data and the status information. The pattern analyzing unit 135 may analyze a relationship between the status information and the sensor data by using the stored sensor data and the status information. The pattern analyzing unit 135 may transmit an analysis result to the allocation unit 132. Thus, the prediction reference may be renewed.

The pattern analyzing unit 135 may analyze a pattern of the sensor data by using the stored sensor data. The pattern analyzing unit 135 may transmit an analysis result to the postprocessing unit 133. Thus, the filtering reference may be renewed.

Figure 4:
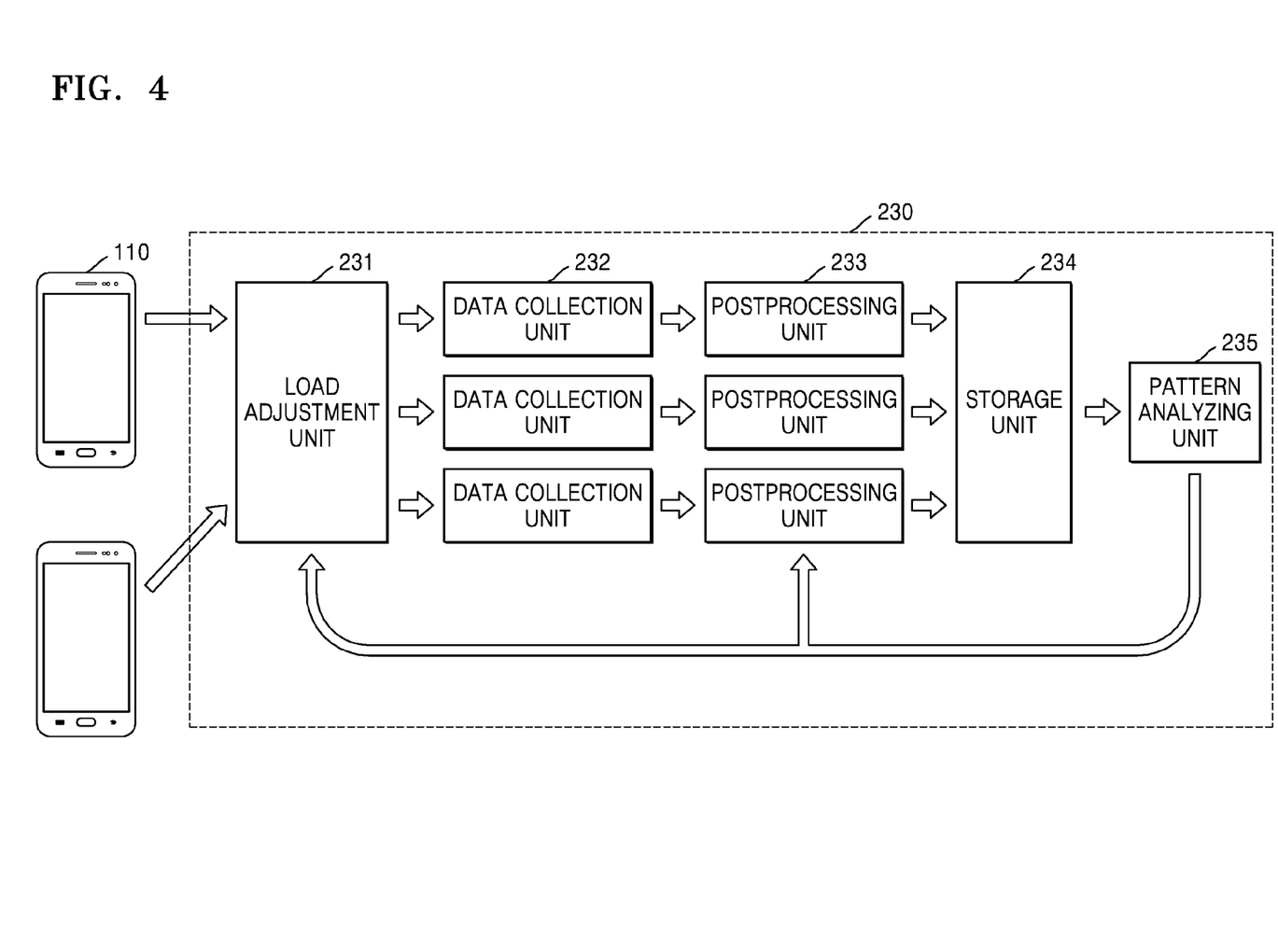
FIG. 4 is a block diagram of a system for processing sensor data streams, according to another embodiment.

FIG. 4 is a block diagram of a system 230 for processing sensor data streams, according to another embodiment. Referring to FIG. 4, the system 230 may include, for example, a load adjustment unit 231, a data collection unit 231, a postprocessing unit 233, a storage unit 234, and a pattern analyzing unit 235.

The load adjustment unit 231 may receive the sensor data streams and status information from the terminal device 110. The load adjustment unit 231 may monitor a status of the data collection unit 232. The load adjustment unit 231 may monitor a resource change in each of the data collection unit 232. The load adjustment unit 231 may store information regarding an availability of each of the data collection units 232 and a load level thereof. The load adjustment unit 231 may select and allocate the data collection units 232 suitable for the terminal device 110 from among the plurality of data collection units 232 by using the information regarding the availability of each of the data collection units 232 and the load level thereof.

The load adjustment unit 231 may allocate the terminal device 110 to the data collection unit 232 according to a status of each of the data collection units 232. The load adjustment unit 231 may transmit the sensor data streams to the data collection unit 232 to which the terminal device 110 has been allocated.

The load adjustment unit 231 may predict a data amount included in the sensor data streams of the terminal device 110 by using the status information received from the terminal device 110 and a prediction reference. The load adjustment unit 231 may select and allocate the data collection units 232 suitable for the terminal device 110 from among the plurality of data collection units 232 by using the status information received from the terminal device 110. The load adjustment unit 231 may select and allocate the data collection units 232 suitable for the terminal device 110 according to the data amount predicted by using the status information received from the terminal device 110.

The data collection unit 232 may be connected to the load adjustment unit 231. The data collection unit 232 may receive the sensor data streams from the load adjustment unit 231. A system 230 may include at least one data collection unit 232. The single data collection unit 232 may correspond to the at least one terminal device 110. The single terminal device 110 may correspond to only the single data collection unit 232. Thus, only the single data collection unit 232 may receive all sensor data streams from the single terminal device 110.

The postprocesing unit 233 may remove noise data from sensor data included in the sensor data streams received from the data collection unit 232. The postprocessing unit 233 may remove the noise data included in the sensor data streams according to a filtering reference.

The storage unit 234 may store the sensor data included in the sensor data streams and status information. The storage unit 234 may receive and store the sensor data from which noise data has been removed from the postprocessing unit 233.

The pattern analyzing unit 235 may renew the prediction reference or the filtering reference by using the stored sensor data and the status information. The pattern analyzing unit 235 may analyze a relationship between the status information and the sensor data by using the stored sensor data and the status information. The pattern analyzing unit 235 may transmit an analysis result to the load adjustment unit 231 or the postprocessing unit 233. Thus, the prediction reference or the filtering reference may be renewed.

Figure 5:
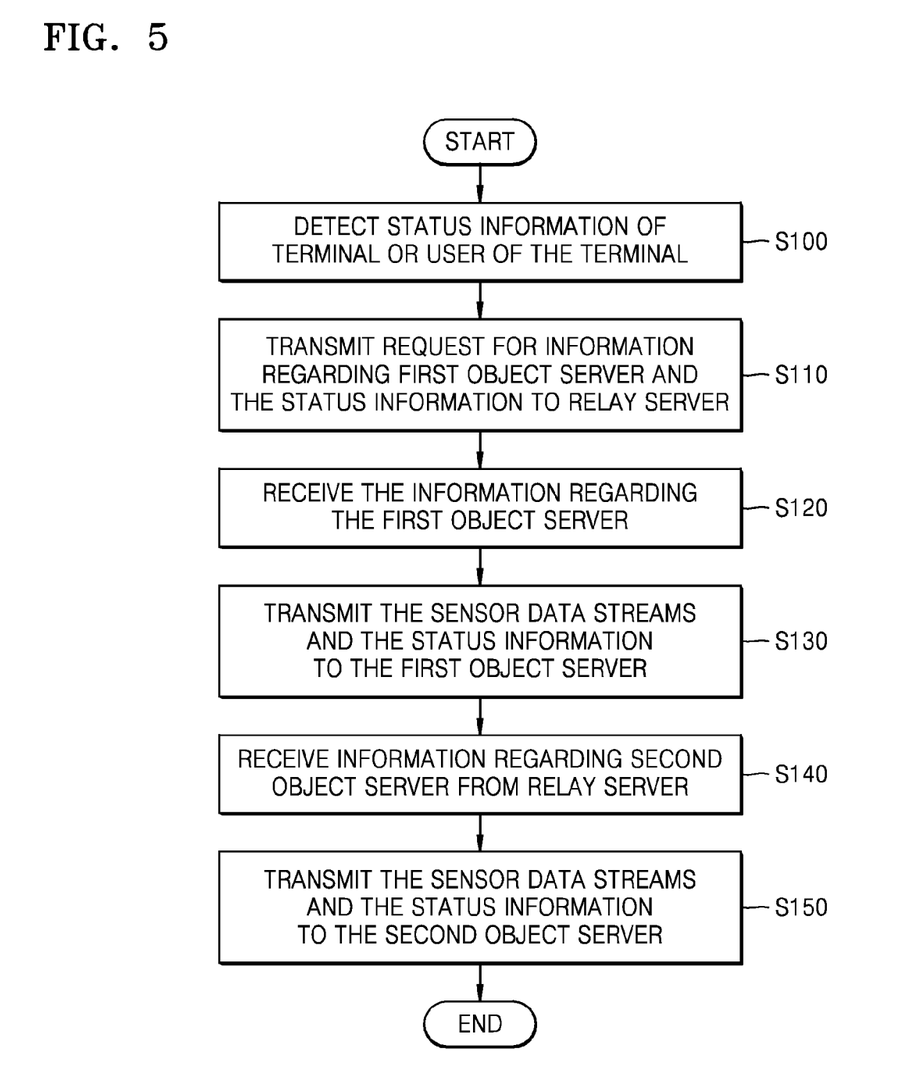
FIG. 5 is a flowchart of a process in which a terminal device performs a method of processing sensor data streams, according to an embodiment.

FIG. 5 is a flowchart of a process in which the terminal device 110 performs a method of processing sensor data streams, according to an embodiment. Referring to FIG. 5, an operation (S100) of detecting status information of the terminal device 110 or a user of the terminal device 110 may be performed. The status recognition unit 112 of the terminal device 110 may recognize a status of the terminal device 110 or the user of the terminal device 110 by using an activity history of the user, current time information, location information of the terminal device 110, or sensor data detected by the sensing unit 111.

Next, an operation (S110) of transmitting a request for information regarding a first object server to which the sensor data streams are to be transmitted and the status information to a relay server may be performed. The relay server may correspond to the allocation unit 132 of the system 130. The first object server may correspond to the data collection unit 131 of the system 130.

The terminal device 110 may transmit the request for the information regarding the first object server and the status information detected by the status recognition unit 112 to the allocation unit 132 of the system 130. The allocation unit 132 may allocate the terminal device 110 to the data collection units 131 according to the status information and a status of each of the data collection units 131 in response to the request.

Next, in response to the request, an operation (S120) of receiving the information regarding the first object server may be performed. The allocation unit 132 may transmit information regarding the data collection units 131 to which the terminal device 110 has been allocated, to the terminal device 110. The terminal device 110 may receive the information regarding the data collection units 131 from the allocation unit 132.

Next, an operation (S130) of transmitting the sensor data streams and the status information to the first object server may be performed. The communication unit 113 of the terminal device 110 may transmit the sensor data streams including the sensor data detected by the sensing unit 111 and the status information detected by the status recognition unit 112 to the data collection unit 131.

Next, an operation (S140) of receiving information regarding a second object server from the relay server may be performed. The allocation unit 132 of the system 130 may newly allocate the terminal device 110 to another data collection unit 131 from the previously allocated data collection unit 131 by using a result of monitoring the data collection units 131.

Next, the operation (S150) of transmitting the sensor data streams and the status information to the second object server may be performed. The communication unit 113 of the terminal device 110 may transmit the sensor data streams including the sensor data detected by the sensing unit 111 and the status information detected by the status recognition unit 112 to the newly allocated data collection unit 131.

Figure 6:
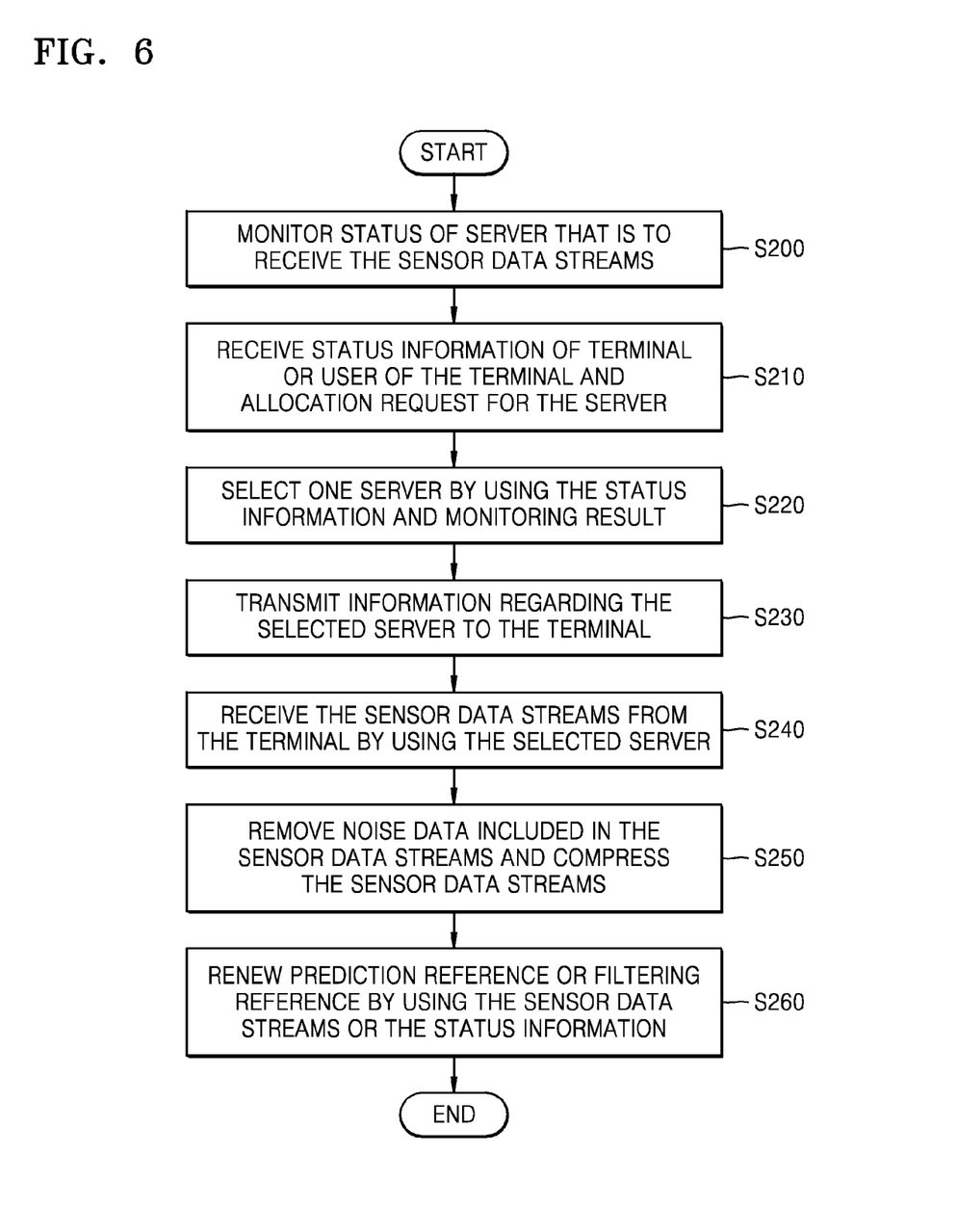
FIG. 6 is a flowchart of a process in which a system performs a method of processing sensor data streams, according to an embodiment.

FIG. 6 is a flowchart of a process in which the system 130 performs a method of processing sensor data streams, according to an embodiment. Referring to FIG. 6, an operation (S200) of monitoring a status of at least one server that is to receive the sensor data streams from the terminal device 110 may be performed. The allocation unit 132 of the system 130 may monitor a status of the at least one data collection unit 131.

Next, an operation (S210) of receiving status information of the terminal device 110 or a user of the terminal device 110 and an allocation request for the server may be performed. The allocation unit 132 may receive the status information and the allocation request from the terminal device 110.

Next, an operation (S220) of selecting one of the servers by using the received status information and a monitoring result may be performed in response to the allocation request. The allocation unit 132 may select and allocate the data collection unit 131 suitable for the terminal device 110 from among the data collection units 131.

The allocation unit 132 may predict an amount of data included in the sensor data streams from the terminal device 110 by using the received status information and a prediction reference. The allocation unit 132 may select one of the servers by using the predicted amount of data and the monitoring result.

For example, it is assumed that a current load of the first data collection unit 131 is 40%, and a current load of the second data collection unit 131 is 60% as a result of monitoring. It is also assumed that a load of 50% is predicted as a result of predicting the amount of data. The allocation unit 132 may select the first data collection unit 131.

Next, an operation (S230) of transmitting information regarding the selected server to the terminal device 110 may be performed. The allocation unit 132 may transmit information regarding the allocated data collection unit 131 to the terminal device 110.

Next, an operation (S240) of receiving the sensor data streams from the terminal device 110 by using the selected server may be performed.

Next, an operation (S250) of removing noise data included in the received sensor data streams and compressing the sensor data streams from which noise data has been removed according to a filtering reference may be performed. The postprocessing unit 133 may remove the noise data according to a filtering reference. The postprocessing unit 133 may compress the sensor data streams from which noise data has been removed.

Next, an operation (S260) of renewing the prediction reference or the filtering reference by using the received sensor data streams and the status information may be performed. The pattern analyzing unit 135 may analyze a relationship between the status information and sensor data by using the sensor data streams and the status information. The pattern analyzing unit 135 may transmit an analysis result to the allocation unit 132. Thus, the prediction reference may be renewed.

The pattern analyzing unit 135 may analyze a pattern of the sensor data by using the sensor data streams. The pattern analyzing unit 135 may transmit an analysis result to the allocation unit 132. Thus, the filtering reference may be renewed.

According to the embodiments described above, the sensor data streams may be efficiently processed. The noise data included in the sensor data streams may be effectively filtered. The sensor data streams may be more efficiently transmitted or received. A load of a server receiving the sensor data streams may be efficiently adjusted.

Status information of the terminal device 110 or a user of the terminal device 110 may be used to dynamically change a server to which the terminal device 110 has been allocated, and thus a load of the server may be efficiently adjusted. A prediction reference renewed in real time may be used to previously predict an amount of data included in received sensor data streams in the future, and a prediction result may be used to appropriately allocate the terminal device 110 to the server, and thus the load of the server may be efficiently adjusted.

Noise data may be effectively removed by the postprocessing unit 133 included in the system 130, and repeated sensor data may be compressed, and thus a storage space may be reduced.

As described above, according to the one or more of the above embodiments, sensor data streams may be efficiently processed.

Noise data included in sensor data streams may be effectively filtered. Sensor data streams may be more efficiently transmitted or received. A load of a server receiving sensor data streams may be efficiently adjusted.

The methods according to the above-described example embodiments may be recorded in non-transitory computer-readable media including program instructions to implement various operations embodied by a computer. The media may also include, alone or in combination with the program instructions, data files, data structures, and the like. The program instructions recorded on the media may be those specially designed and constructed for the purposes of the example embodiments, or they may be of the kind well-known and available to those having skill in the computer software arts.

The media may also include, alone or in combination with the program instructions, data files, data structures, and the like. Examples of non-transitory computer-readable media include magnetic media such as hard disks, floppy disks, and magnetic tape; optical media such as CD ROM discs and DVDs; magneto-optical media such as optical discs; and hardware devices that are specially configured to store and perform program instructions, such as read-only memory (ROM), random access memory (RAM), flash memory, and the like.

Examples of program instructions include both machine code, such as produced by a compiler, and files containing higher level code that may be executed by the computer using an interpreter. The described hardware devices may be configured to act as one or more software modules in order to perform the operations of the above-described embodiments, or vice versa.

Any one or more of the software modules described herein may be executed by a dedicated hardware-based computer or processor unique to that unit or by a hardware-based computer or processor common to one or more of the modules. The described methods may be executed on a general purpose computer or processor or may be executed on a particular machine such as the system for processing sensor data and data processing apparatuses and servers described herein.

It should be understood that the exemplary embodiments described therein should be considered in a descriptive sense only and not for purposes of limitation. Descriptions of features or aspects within each embodiment should typically be considered as available for other similar features or aspects in other embodiments.

While one or more embodiments have been described with reference to the figures, it will be understood by those of ordinary skill in the art that various changes in form and details may be made therein without departing from the spirit and scope of the present invention as defined by the following claims.

What is claimed is:

1. A system comprising:
a plurality of data collection units, each data collection unit configured to receive respective sensor data from each terminal device of a plurality of terminal devices having at least one sensor detecting the respective sensor data regarding an environment of the plurality of terminal devices;
an allocation unit including at least one processor configured to:
monitor a resource change of each data collection unit of the plurality of data collection units,
select a data collection unit of the plurality of data collection units based on a result of the monitoring to efficiently adjust a load of the plurality of data collection units, and
allocate at least one terminal device of the plurality of terminal devices to the selected data collection unit, wherein the selected data collection unit receives the respective sensor data from the allocated at least one terminal device; and
a postprocessing unit configured to remove noise data from the respective sensor data received by the selected data collection unit.

2. The system of claim 1, wherein the allocation unit is further configured to receive status information of the at least one terminal device and an allocation request from the at least one terminal device, and is further configured to select the data collection unit based on the received status information and the received allocation request.

3. The system of claim 2, wherein the status information comprises an activity history of a user, status time information, location information of the at least one terminal device, or information corresponding to the respective sensor data.

4. The system of claim 2, wherein the resource change includes an availability and a load level of the data collection unit, and the allocation unit is further configured to select the data collection unit by using the availability and the load level of the data collection unit.

5. The system of claim 1, wherein the allocation unit is further configured to receive status information of the at least one terminal device and an allocation request from the at least one terminal device, predict an amount of data included in the respective sensor data from the at least one terminal device by using the received status information and a prediction reference, and is further configured to select the data collection unit based on the predicted amount of data and the received allocation request.

6. The system of claim 5, wherein the prediction reference comprises information regarding a relationship between the received status information and the amount of data.

7. The system of claim 6, further comprising:
a pattern analyzing unit configured to analyze the relationship between the received status information and the amount of data and update the prediction reference based on a result of the analysis.

8. The system of claim 1, wherein the postprocessing unit is further configured to remove the noise data from the respective sensor data according to a filtering reference and compress the respective sensor data from which the noise data has been removed.

9. The system of claim 8, further comprising:
a pattern analyzing unit configured to analyze a pattern of the respective sensor data and update the filtering reference based on a result of the analysis.

10. The system of claim 1, wherein the respective sensor data is from at least one of a location sensor, a temperature sensor, a humidity sensor, a noise sensor, an optical sensor, an image sensor, a biological sensor, and an acceleration sensor of the respective terminal device.

11. A data processing apparatus comprising:
a plurality of data collection units, each data collection unit configured to receive respective sensor data from each external device of a plurality of external devices having at least one sensor detecting the respective sensor data regarding an environment of the plurality of external devices;
an allocation unit including at least one processor configured to
monitor a resource change of each data collection unit of the plurality of data collection units, and
allocate a data collection unit of the plurality of data collection units to an external device of the plurality of external devices based on the resource change of each data collection unit and status information received from the external device to efficiently adjust a load of the plurality of data collection units; and
a postprocessing unit configured to remove noise data from the respective sensor data received by the allocated data collection unit.

12. The data processing apparatus of claim 11, wherein the resource change of each data collection unit comprises a load level of each respective data collection unit.

13. The data processing apparatus of claim 12, wherein the status information received from the external device includes a data output of the external device.

14. The data processing apparatus of claim 13, wherein the status information received from the external device includes a predicted data output of the external device.

15. The data processing apparatus of claim 14, wherein the allocation unit is further configured to predict the predicted data output of the external device using the status information received from the external device and a prediction reference comprising information about a relationship between the status information received from the external device and the predicted data output.

* * * * *